United States Patent
Subbiah et al.

(10) Patent No.: US 12,367,417 B2
(45) Date of Patent: Jul. 22, 2025

(54) ASSESSING CONDITIONS OF INDUSTRIAL EQUIPMENT AND PROCESSES

(71) Applicant: ABB Schweiz AG, Baden (CH)

(72) Inventors: Subanatarajan Subbiah, Neulussheim (DE); Benjamin Kloepper, Mannheim (DE)

(73) Assignee: ABB Schweiz AG, Baden (CH)

( * ) Notice: Subject to any disclaimer, the term of this patent is extended or adjusted under 35 U.S.C. 154(b) by 536 days.

(21) Appl. No.: 16/921,951

(22) Filed: Jul. 7, 2020

(65) Prior Publication Data

US 2021/0012242 A1    Jan. 14, 2021

(30) Foreign Application Priority Data

Jul. 8, 2019    (EP) ..................... 19184982

(51) Int. Cl.
  *G05B 23/02*    (2006.01)
  *G06N 20/00*    (2019.01)
(52) U.S. Cl.
  CPC ........... *G06N 20/00* (2019.01); *G05B 23/024* (2013.01)
(58) Field of Classification Search
  CPC .................................................. G05B 23/024
  See application file for complete search history.

(56) References Cited

U.S. PATENT DOCUMENTS

| | | | | |
|---|---|---|---|---|
| 6,611,786 B1 * | 8/2003 | Zhang | .................... | G01B 21/00 |
| | | | | 702/156 |
| 7,656,122 B2 * | 2/2010 | Plett | .................. | G01R 31/3648 |
| | | | | 320/128 |

(Continued)

FOREIGN PATENT DOCUMENTS

| | | | | |
|---|---|---|---|---|
| CN | 103116277 A | * | 5/2013 | ............. G05B 15/02 |
| CN | 104570771 A | | 4/2015 | |

(Continued)

OTHER PUBLICATIONS

Machine Translation for CN-103116277-A, obtained Sep. 2022 (Year: 2022).*

(Continued)

*Primary Examiner* — Robert E Fennema
*Assistant Examiner* — Vi N Tran
(74) *Attorney, Agent, or Firm* — Leydig, Voit & Mayer, Ltd.

(57) ABSTRACT

A method for training a machine-learning model to assess at least one condition of industrial equipment, and/or at least one condition of a process running in an industrial plant, based on measurement data gathered by a plurality of sensors, includes: obtaining a plurality of records of measurement data that correspond to a variety of operating situations and a variety of conditions; obtaining, for each record of measurement data, a label that represents a condition in the operating situation characterized by the record of measurement data; and determining a plausibility of at least one record of measurement data, and/or a plausibility of at least one label, based at least in part on a comparison with at least one other record of measurement data, with at least one other label, and/or with additional information about the industrial equipment, and/or about the industrial plant where the industrial equipment resides, and/or about the process.

8 Claims, 3 Drawing Sheets

(56) References Cited

U.S. PATENT DOCUMENTS

| | | | |
|---|---|---|---|
| 8,682,835 | B1 | 3/2014 | Bickford |
| 9,396,523 | B2* | 7/2016 | Jancsary .................. G06T 5/001 |
| 10,198,505 | B2* | 2/2019 | Frank .................... G06Q 10/101 |
| 10,483,006 | B2* | 11/2019 | Itu .......................... G16B 25/10 |
| 10,746,405 | B2* | 8/2020 | Vitt ........................ F23N 5/242 |
| 10,990,894 | B2* | 4/2021 | Shaashua ................ G06F 16/35 |
| 11,061,650 | B2* | 7/2021 | Turek ..................... G06F 40/00 |
| 11,544,554 | B2* | 1/2023 | Shimasaki ......... G05B 23/0221 |
| 2004/0002776 | A1* | 1/2004 | Bickford ............ G05B 23/0254 700/52 |
| 2008/0033693 | A1* | 2/2008 | Andenna ............ G05B 23/0221 702/179 |
| 2009/0187402 | A1* | 7/2009 | Scholl .................... G10L 15/01 704/E15.039 |
| 2013/0150106 | A1* | 6/2013 | Bucknell ................ H04W 4/70 455/501 |
| 2015/0226633 | A1* | 8/2015 | Greimann ........... G01M 5/0008 73/786 |
| 2016/0148099 | A1 | 5/2016 | Micali et al. |
| 2016/0178414 | A1 | 6/2016 | Saha et al. |
| 2017/0161963 | A1* | 6/2017 | Green ..................... G07C 5/004 |
| 2017/0205817 | A1* | 7/2017 | Lyons ................ G05B 23/0272 |
| 2017/0255203 | A1 | 9/2017 | Sofman et al. |
| 2018/0046151 | A1* | 2/2018 | Ahmed ................... G06N 20/20 |
| 2018/0079085 | A1 | 3/2018 | Nakata et al. |
| 2018/0101148 | A1* | 4/2018 | Takami .................. G05B 13/04 |
| 2018/0180421 | A1 | 6/2018 | Holz |
| 2019/0057170 | A1 | 2/2019 | Burriesci et al. |
| 2019/0121348 | A1* | 4/2019 | Cella .................. G05B 19/4185 |
| 2020/0034665 | A1* | 1/2020 | Ghanta ................... G06F 17/18 |
| 2020/0167652 | A1* | 5/2020 | Huang ................... G06N 5/043 |
| 2020/0225288 | A1* | 7/2020 | Park ..................... G01R 31/367 |
| 2020/0249651 | A1* | 8/2020 | Lee .................. G05B 19/41875 |
| 2021/0306425 | A1* | 9/2021 | Baugh .................... G05B 17/02 |
| 2022/0038124 | A1* | 2/2022 | Eleftheriadis .......... H04B 15/02 |

FOREIGN PATENT DOCUMENTS

| | | | |
|---|---|---|---|
| CN | 106505475 | A | 3/2017 |
| CN | 206530447 | U | 9/2017 |
| CN | 108764088 | A | 11/2018 |
| CN | 109917772 | A | 6/2019 |
| EP | 1877877 | A1 | 1/2008 |
| EP | 3105644 | A1 | 12/2016 |
| JP | 6-167591 | A | 6/1994 |
| KR | 20070061079 | A | 6/2007 |
| KR | 10-2018-0074188 | A | 7/2018 |
| WO | WO-2018232930 | A1 * | 12/2018 ......... G05B 19/4185 |

OTHER PUBLICATIONS

Machine Translation for WO-2018232930-A1, obtained Sep. 2022 (Year: 2022).*

Liao et al., "Research Status of Condition Assessment Method for Power Equipment," *High Voltage Engineering*, 44(11): 3454-3464 (Nov. 30, 2018), English abstract.

Wu, "Research on Path Optimization of Equipment Inspection Based on Improved Genetic Algorithm," Master's thesis, Hebei Univ. of Tech., 72 pp. (Dec. 2016), English abstract.

Xie, "Design and Implementation of Equipment Health Monitoring System Based on Internet of Things and Big Data Analysis," Master's thesis, Beijing Jiaotong Univ., 103 pp. (Mar. 2018), English abstract.

Xiao, "Performance Degradation Evaluation and Intelligent Fault Diagnosis for Hydropower Generator Unit," *Dissertation, Huazhong University of Science & Technology (HUST)*, 115 pp. (Jun. 2, 2014), English translation.

* cited by examiner

ASSESSING CONDITIONS OF INDUSTRIAL EQUIPMENT AND PROCESSES

CROSS-REFERENCE TO PRIOR APPLICATION

Priority is claimed to European Patent Application No. EP 19 184 982.7, filed on Jul. 8, 2019, the entire disclosure of which is hereby incorporated by reference herein.

FIELD

The invention relates to assessing the health status of industrial equipment, or any other conditions of the equipment or of an industrial process in which the equipment is used, using a trained machine-learning model, based on measurement data gathered by sensors.

BACKGROUND

Many industrial plants comprise industrial equipment assets that are not equipped with on-line condition monitoring systems. The health status of such equipment is presently checked by human operators who patrol the plant. Based on sensory perceptions, such as visible leaks, audible noises and feelable vibrations, a human operator may deduce abnormalities of the equipment and flag it for maintenance. Human operators also perform visual inspection on processes, such as chemical production processes, to determine the quality or identify abnormal process conditions (for instance, foaming in a reactor).

This manual process is labor-intensive and thus costly. Some of this effort is wasted because even though not all equipment needs a check of the health status at the same time, this may not decrease the length of the walk through the plant.

Also, there are sources of error in the manual process. Sensory perceptions are subjective and may be attributed to the wrong equipment. For example, it may be misjudged from which direction sound is coming.

SUMMARY

In an embodiment, the present invention provides a method for training a machine-learning model to assess at least one condition of industrial equipment, and/or at least one condition of a process running in an industrial plant, based on measurement data gathered by a plurality of sensors, the method comprising: obtaining a plurality of records of measurement data that correspond to a variety of operating situations and a variety of conditions; obtaining, for each record of measurement data, a label that represents a condition in the operating situation characterized by the record of measurement data; determining a plausibility of at least one record of measurement data, and/or a plausibility of at least one label, based at least in part on a comparison with at least one other record of measurement data, with at least one other label, and/or with additional information about the industrial equipment, and/or about the industrial plant where the industrial equipment resides, and/or about the process; and in response to the plausibility meeting at least one predetermined criterion, including the record of measurement data and the label in a set of training data on which the machine-learning model is to be trained.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 2: Exemplary embodiment of the method 200 for assessing the condition 50c, 51a;

DETAILED DESCRIPTION

In an embodiment, the present invention provides an automated monitoring of the conditions of industrial equipment or processes that is less labor-intensive and less error-prone.

In an embodiment, the present invention provides a method for training a machine-learning model as described herein and by a method for assessing one or more conditions of industrial equipment, and/or of a process, also as described herein. Further advantageous embodiments are also described herein.

The invention provides a method for training a machine-learning model to assess at least one condition, such as a health status, of industrial equipment, and/or at least one condition of a process running in an industrial plant, based on measurement data gathered by a plurality of sensors. The goal of the method is to train the model into a state where one can input measurement data into the model and the model returns an accurate indication of the condition of the equipment or process.

The term "machine-learning model" comprises every model that to be trained on a finite set of training examples and has a power to generalize the gained experience to situations that have not been part of the training. Prime examples are artificial neural networks or support vector machines.

The condition of the equipment may, for example, comprise a health status. The health status may, for example, comprise an indication whether the equipment or process is presently operating normally. The health status may also, for example, comprise a prediction of one or more failures that are likely to occur in the future, and/or an estimate of the remaining useful life of the equipment. Most failures that occur due to wear and tear give advance notice that may be picked up by sensors. For example, a pump that has a bearing problem is likely to emit an increased amount of vibration or noise while the pump continues to run normally. But if the bearing is not fixed in time, it may fail completely.

The condition of a process may, for example, comprise the presence or absence of an issue in the production process, like foaming of a process liquid that might lead to an overflow of a vessel. The presence of leakages of certain substances in a process plant is another example.

In the course of the training method, a plurality of records of measurement data are obtained. The records correspond to a variety of operating situations and to a variety of conditions of the equipment, and/or of the process. The term "obtaining" is not limited to a measurement in real time. Rather, it is more likely that measurement data are gathered for quite some time before the actual training is started.

For each record of measurement data, a label is obtained. This label represents the condition of the equipment, and/or of the process, in the operating situation characterized by this record of measurement data. Again, the term "obtaining" is not limited to labelling in real time. Rather, a collection of measurement data may be gathered first and labelled later. The label may come from any source. For example, the label may be obtained from a human expert.

Any suitable translation may be applied to the input from a human expert. For example, when the human expert inputs that a certain sensory impression (such as noise) is present in a certain operating situation, then the label may be assigned only to records with measurement data from sensors that are able to pick up this sensory impression. For example, if the sensory impression is noise, then the to-be-labelled data may comprise measurement data captured by at least one microphone.

The term "measurement data" is not limited to real measurement data that has actually been captured by one or more sensors. Rather, the measurement data may also be, for example, obtained through simulation using a model of the equipment and/or of the industrial process. Also, starting from measurement data that are already labelled, artificial measurement data that are consistent with the same label may be produced by techniques such as "generative adversarial networks". For example, given enough records of measurement data that indicate a bearing problem in a pump, it is possible to computationally generate more records of artificial measurement data that are indistinguishable from said actually measured ones. One ends up with having a higher variability of measurement data records that indicate a bearing problem.

The plausibility of at least one record of measurement data, and/or of at least one label, is determined based at least in part on a comparison with at least one other record of measurement data, with at least one other label, and/or with additional information about the industrial equipment, and/or about the industrial plant where this equipment resides, and/or about the process. For example, the additional information may be acquired from a distributed control system, DCS, of the industrial plant.

In response to the plausibility meeting at least one predetermined criterion, the record of measurement data and the label are included in the set of training data on which the machine-learning model is to be trained. For example, the criterion may comprise a threshold value.

The inventors have found that the automated plausibility check increases the accuracy of the associations between records of measurement data and labels in the final set of training data on which the machine-learning model will be trained. In particular, there will be more correct "ground truth" and less errors and contradictions in the set of training data. In this manner, the finally obtained machine-learning model is more likely to deliver an accurate assessment of the condition of the equipment, and/or of the process, based on a record of physical measurement data.

That is, the plausibility check serves to suppress an inherent subjective component in the labelling of measurement data by humans, so that this disadvantage of human surveillance of the equipment is not carried over to the automated monitoring.

In a particularly advantageous embodiment, the comparison includes measurement values of the same physical quantity acquired by different sensors in different places within the sphere of influence of the industrial equipment. By virtue of this equipment being present and/or being operated, the values of the physical quantity in the different places may be tied to one another somehow. For example, the amount by which the quantity may vary between the different places may be limited.

For example, the industrial equipment may comprise a pump. The record of measurement data may comprise measurement data of noise and/or vibration acquired in an inlet area of the pump, as well as measurement data of noise and/or vibration acquired in an outlet area of the pump. Then it can be reasonably expected that the noise and/or vibration in the outlet area of the pump will be somewhat similar to the noise and/or vibration in the inlet area of the pump. For example, since the noise and/or vibration captured in both places is generated by the same source, the frequency spectra should be similar and also correlated to the rotating speed of the pump. Also, the strength of the vibration should be correlated to whether the pump is running or not.

For example, if the measurement data indicate a vibration, but the pump is not running, then the pump cannot be the source of this vibration. In another example, if measurement data indicate that the pressure downstream of the pump is higher than the pressure upstream of the pump, this indicates that the pump is operating. This is inconsistent with a label indicating that the pump is not operating. A possible cause for such an inconsistency is that the wrong one of several present pumps has been labelled as not operating. This may, for example, occur in setups comprising multiple parallel pumps that are close together.

In a further particularly advantageous embodiment, the comparison includes measurement values of different physical quantities that are related to one another by the intended operation of the industrial equipment. That is, this indended operation may be exploited as additional knowledge for the plausibility check.

In the mentioned example where the industrial equipment comprises a pump, the different physical quantities may comprise at least two of the following: noise, vibration, output mass flow, output pressure, electrical power consumption. For example, there should be no output mass flow if the pump does not consume electrical power.

In a further particularly advantageous embodiment, in response to determining that the plausibility fails to meet the criterion, a human expert is prompted for a decision what do next. The expert may accept the combination of the measurement data and the label as plausible, and he may optionally amend the measurement data and/or the label in this process. For example, if it is determined that the expert has labelled the wrong pump as not running, the expert may correct this.

Also, in a further particularly advantageous embodiment, the record of measurement data, and/or the label, is compared to at least one other record of measurement data, and/or to at least one other label, obtained for another instance of the same kind of equipment within the same industrial plant. The result of this comparison may be presented to the expert in the course of prompting the expert for the decision.

For example, if the combination of a record of measurement data and a label indicates an issue with one piece of equipment, and this fails the plausibility check, it may be checked whether an amendment to the measurement data (i.e., the observed symptoms) or to the label (i.e., the root cause of the symptoms inferred from the measurement data) may render the combination of the record of measurement data and the label plausible. Also, a search for similar equipment in the industrial plant may be performed. It may then be determined whether the combination of the measurement data and the label plausibly indicates an issue with a different but similar piece of equipment. The expert may then be presented with a list of different amendments that may render the combination of the record of measurement data and the label plausible, so that the expert may correct any mistakes.

For example, in a set of parallel pumps, a bearing problem indicated by vibration measurements may have been attributed to a first pump, while a second pump is the one that is actually faulty. Also, some symptoms may be ambiguous in the sense that they are consistent with several types of faults, so that a differential diagnosis with more measurement data is required. For example, a high amplitude of vibration may indicate several faults, but if the dependency of this amplitude on the rotation speed of the pump shows a resonance peak, some of these faults may be ruled out.

The method may further comprise optimizing a set of parameters that characterize the behavior of the machine-learning model such that the machine-learning model maps the records of measurement data in the set of training data to their respective labels with sufficient accuracy. This step may be performed by the same entity that checks the plausibility of the measurement data and/or of the labels, but this is not required. Rather, the overall project of obtaining a trained machine-learning model to assess one or more conditions of equipment, and/or of a process, may be broken down into sub-tasks that are performed by different entities. For example, a first entity may collect raw measurement data and give them to a second entity for labeling. A third entity may obtain the labeled records of measurement data from the second entity and weed out, and/or amend, records of measurement data, and/or labels, that are not plausible. The records of measurement data and labels that have been refined in this manner may be passed on to a fourth entity who optimizes the set of parameters and thereby performs the final training of the machine-learning model.

Especially in such a constellation, the plausibility check serves to solve the inherent conflict between the quantity, the quality and the cost of obtaining labeled records of measurement data. In particular, the cost may disproportionally increase with the desired quality. For example, to reduce image noise beyond a certain point may require changing from an image sensor operated at room temperature to a sensor that needs to be cooled with liquid nitrogen. To increase the accuracy of labels beyond a certain point may require reassigning the labeling task to a better human expert who charges a higher fee per hour. The plausibility check eases the quality requirements for the records of measurement data and for the labels. I.e., measurement data and/or labels of a lesser quality grade may be used. This in turn means that for a given amount of money, more data may be obtained. This increases the variability of the situations that the machine-learning model experiences during the training. The end result is that the trained machine-learning model will have a higher power of generalization when handling situations that have not been part of the training.

The possibility to assign different sub-tasks to different entities creates new products that have a saleable value of their own. For example, a manufacturer of a machine-learning system may buy the set of training data from a first supplier and pass this on to a second supplier who then performs the training of the machine-learning model. This second supplier may then deliver the set of parameters that characterize the behavior of the machine-learning model. Using this set of parameters, an arbitrary quantity of machine-learning models (and modules incorporating these models) may be produced by the manufacturer. The invention therefore also relates to a set of training data, and/or to a set of parameters, obtained using the method as discussed above.

The discussion of the training method shows that even when starting from a given set of labeled records of measurement data, different machine-learning models may be created. But there are still more degrees of freedom. Different sets of records of measurement data may be used to train specific aspects of assessing conditions of equipment, and/or of a process, from the measurement data. For example, a first model may be trained based on records of noise data captured by microphones, a second model may be trained based on records of images captured by cameras, and a third model may be trained using a combination of the two. During operation of the industrial plant, it is not set in stone which of the models is most appropriate to assess the sought condition of the equipment, and/or of the process. Rather, different models may be appropriate in different situations.

For example, in a particular operating situation, the noise data may be impaired because builders are at work on the site with a percussion drill. In this case, a model that is at least in part based on noise data and that does not take the disturbance from the drill into account may come to a wrong conclusion, so that the second model that only uses images may be more appropriate in this situation. But in a "normal" operating situation where neither the noise measurement nor the image acquisition is disturbed, the third, most comprehensive model may be more appropriate.

The invention therefore also provides a method for assessing at least one condition of industrial equipment, and/or at least one condition of a process running in an industrial plant. In the course of this method, at least one record of measurement data is obtained that describes an operating situation of the equipment, and/or of the process. For example, the measurement data may be acquired using a plurality of sensors, but this is not mandatory. Rather, the entity that performs the assessing of the condition may also obtain the measurement data from another entity who has physically acquired them using sensors.

A plurality of trained machine-learning models is obtained. Each such trained machine-learning model is configured to map the at least one record of measurement data to an indication of the condition of the equipment, and/or of the condition of the process.

For each of the trained machine-learning models, a figure of fitness to assess the situation described by the at least one record of measurement data is determined. At least one trained machine-learning model whose figure of fitness meets a predetermined criterion is selected. Using the at least one selected trained machine-learning model, the record of measurement data is mapped to the sought condition.

In this manner, the knowledge contained in multiple such trained machine-learning models may be pooled. Each operating situation may be assessed by an appropriate "specialist", so that the most can be made out the measurement data that is available in the respective situation.

In a particularly advantageous embodiment, in the course of determining the figure of fitness, a measure for the quality of the measurement data, and/or for the type and/or the strength of any disturbances contained therein, is determined. The figure of fitness for a trained machine-learning model is determined based at least in part on the fitness of this trained machine-learning model to process measurement data that are of the quality according to the measure, and/or that contain disturbances of the determined type and/or strength.

In the example presented above, if there is another machine-learning model that has specifically been trained to evaluate the condition of equipment from noise measurements even in the presence of intermittent noise from power tools, then this model may be chosen in a situation where such intermittent noise is present. Likewise, there may be further machine-learning models that allow for a better determination of the condition from image data even in low-light or other adverse situations.

In a particularly advantageous embodiment, the determining a measure for the quality of the measurement data specifically comprises supplying the measurement data to a further trained machine-learning model. This further model is specifically configured to produce a classification value, and/or a regression value, as a measure for the quality.

For example, the classification value may indicate whether there is Gaussian noise, shot noise or motion blurring in an image, or whether there is crackling or a hum superimposed on audio measurements. Regression values may, for example, be comprehensive indicators of the quality, or they may, for example, represent strengths of individual disturbances. The knowledge of the kind of disturbance that is present allows for a more appropriate selection of the trained machine-learning model for assessing the condition. It also allows for a more appropriate pre-processing of the measurement data before feeding the measurement data into the selected machine-learning model.

Other possible dimensions for the classification and/or regression of the quality of the measurement data include: alignment between different collected signals, missing data, signal-to-noise ratio, and the probability of erroneous readings.

In a further particularly advantageous embodiment, the selection of the at least one trained machine-learning model is further based on a requirement for the accuracy and/or for the confidence of the assessment of the condition. A model that allows to assess the condition with a greater accuracy and/or with a greater confidence may require more computation time than a model that delivers a lower level of accuracy and/or confidence. Therefore, to speed up the assessment as a whole, the different models may be cascaded. For an initial screening of the plant, a fast cursory assessment by a rather simple model may be sufficient. If this model indicates that there may be something wrong with the condition, e.g., the equipment may be faulty or the process may be running abnormally, then the condition may be investigated further using a more computationally intensive model that works on more complex measurement data.

In a further particularly advantageous embodiment, before obtaining the at least one record of measurement data using a plurality of sensors, a subset of the plurality of sensors is selected according to a database that stores associations between equipment whose condition is to be assessed and sensors that are suitable for assessing a condition of this equipment. In this manner, sensors may be activated only when needed. For example, sensors that operate on a battery, or are otherwise dependent on a finite supply of some consumable, may allow for only a finite quantity of measurements until the consumable runs out. It may then be advantageous to limit their use to situations where something is to be gained from the measurement. This makes the consumable in the sensor last longer.

When selecting sensors, terms for measurement quantities that are used by humans may be automatically mapped to types of sensors. For example, the knowledge of a human expert that a bearing problem is indicated by noise may be automatically translated into an instruction to use microphones for gathering the data.

In a further particularly advantageous embodiment, an interval at which the obtaining of records of measurement data is repeated is determined based on a previous history of the assessed condition. In this manner, the effort for the obtaining of measurement data may be focused onto the equipment that is most likely to need servicing in the near future, or onto processes that have a higher risk of running into an abnormal state.

For example, a pump may have a normal inspection interval specified by its manufacturer. If there is no particular problem, then this inspection interval is sufficient. However, if the pump is a "bad actor" that already has its history of problems, then its condition should be checked at a shorter interval, to keep small problems from becoming big ones.

In another example, the process may initially be quite resistant against the occurrence of foaming in a reactor, but once the first foaming bubbles start to appear, the monitoring of the process should be intensified because an unstable state has been reached and there is a risk that the foaming spreads explosively.

In a further particularly advantageous embodiment, a sensor from which to obtain further measurement data, and/or a piece of equipment to which further measurement data are to relate, is selected based at least in part on an already determined plausibility, and/or on an already assessed condition. For example, if it has been determined that the equipment or process has some problem, then further measurements may be made in order to further identify the type and the severity of the problem. Also, if too few records of measurement data relating to a particular piece of equipment or to a particular process pass the plausibility check, further records of measurement data may be needed to permit a comprehensive training of the machine-learning model.

In a further particularly advantageous embodiment, the plurality of sensors comprises sensors mounted on a service robot that is configured to move between different pieces of equipment, and/or between different processes, in the industrial plant. In this manner, one and the same set of sensors may be re-used for assessing the condition of multiple pieces of equipment, and/or of multiple processes. Saving the duplication of sensors at the location of every piece of equipment, and/or at the location from which each of a plurality of processes of the plant may be monitored, in turn allows to use more sophisticated and accurate sensors.

In particular, because the different types of equipment in the industrial plant, and/or the different processes, need to be inspected at different intervals, the utilization of sensors on a service robot is much better than the utilization of sensors fixed at the location of each piece of equipment, and/or at the location from which each process may be monitored.

In a further particularly advantageous embodiment, the location of the service robot in the industrial plant, and/or an identification of the equipment that is being sensed by the sensors of the service robot, is determined based on a match between measurement data captured by the sensors and pre-stored information about the layout of the industrial plant, and/or about the inventory of the equipment installed in the plant. This is a quick and cost-effective way of determining the location, and/or the identification, even if no signal of a satellite-based or terrestrial navigation system is available. For example, at least part of the industrial plant may be inside a building that shields such signals.

In addition, the match may be used to identify missing equipment. For example, equipment that is only to be used under special circumstances, such a pump that is used twice a year to drain a particular vessel for maintenance, may have been removed because it is needed more urgently somewhere else in the plant. Also, a piece of equipment may have been removed for repairs.

In response to the determined condition meeting a predetermined criterion, any corrective action may be taken. For example, the piece of equipment may be flagged for maintenance and/or repair, and/or for future more frequent inspection;

the operating parameters of the piece of equipment may be changed (e.g., the rotating speed of the pump may be reduced) to ease the load on the piece of equipment;

the operating parameters of the process may be changed to move the process to a stable state (e.g., a state where there is no more foaming); or the piece of equipment, and/or the process, may be shut down to prevent further damage.

The methods may be at least partially implemented on one or more computers. They may therefore be at least partially embodied in software. The invention therefore also relates to a computer program with machine-readable instructions that, when executed by one or more computers, cause the one or more computers to perform a method described above.

For example, the computer program may be delivered on a non-transitory computer-readable storage medium, and/or in a downloadable product. Alternatively or in combination, the storage medium, and/or the downloadable product, may contain the set of training data, and/or the set of parameters. A computer may be equipped with the set of training data, with the set of parameters, with the computer program, with the storage medium, and/or with the downloadable product.

Figure 1:
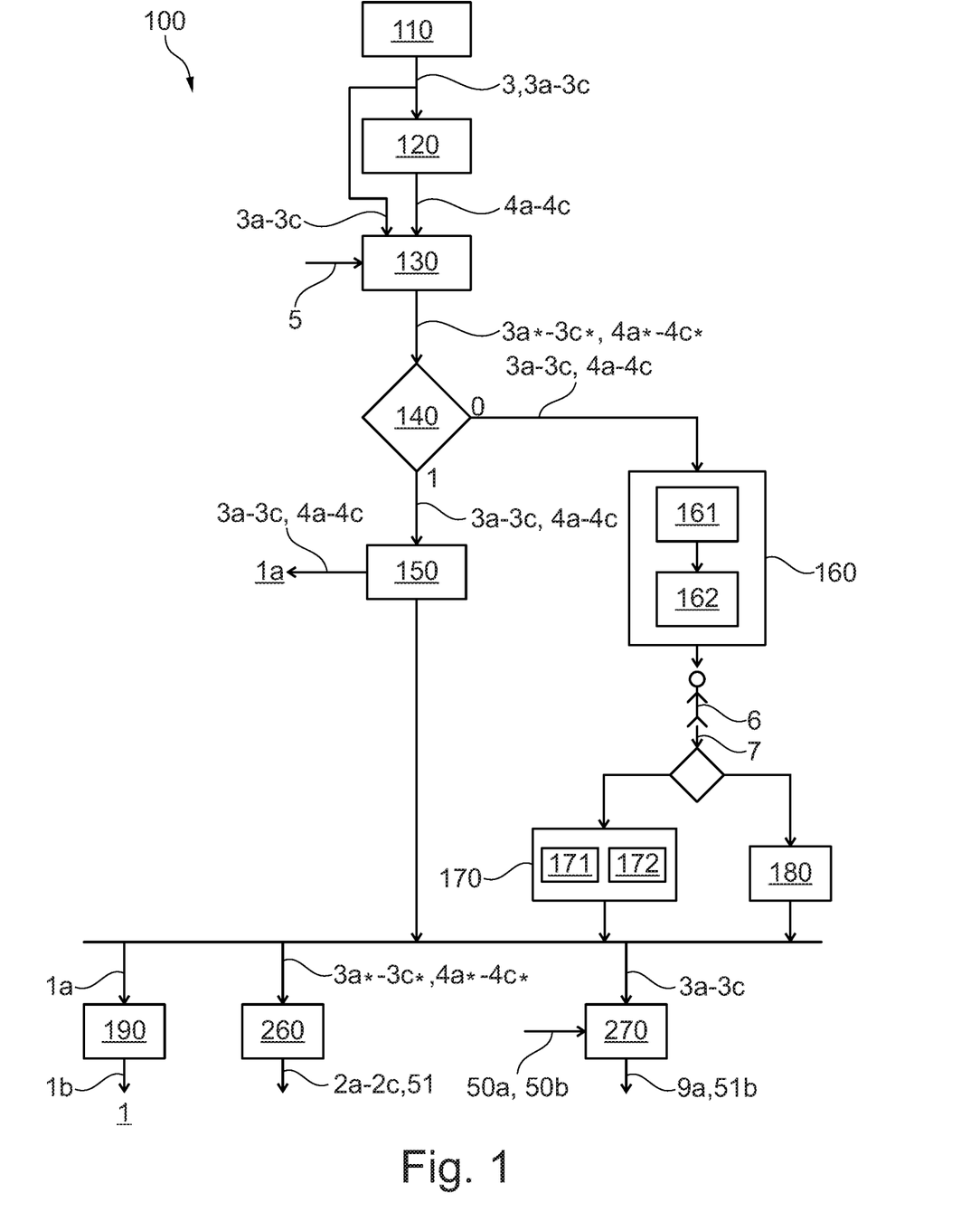
FIG. 1: Exemplary embodiment of the training method 100.

FIG. 1 is a flow chart of an exemplary embodiment of the training method 100. In step 110, a plurality of records 3a-3c of measurement data 3 is obtained. These records 3a-3c correspond to a variety of operating situations and a variety of conditions 51a of equipment 51, and/or of conditions 50c of the process. The condition 50c, 51a is what is to be determined using the trained machine-learning model 1.

In step 120, for each record 3a-3c, a label 4a-4c is obtained. This label 4a-4c assigns a condition Ma of the equipment 51, and/or a condition 50c of the process running in the plant 50, to a record 3a-3c and represents "ground truth" for the training of the machine-learning model 1.

Before this "ground truth" makes it into the set 1a of training data, the plausibility 3a*-3c* of at least record 3a-3c of measurement data 3, and/or the plausibility 4a*-4c* of at least one label 4a-4c, is determined based on a comparison with additional data with which the record 3a-3c, and/or the label 4a-4c, should be consistent. This additional data may comprise other records 3a-3c, other labels 4a-4c, and/or any other additional information 5 about the industrial equipment 51, and/or about the plant 50 in which the equipment 51 resides, and/or about the process running in the plant 50.

The plausibilities 3a*-3c*, 4a*-4c* are evaluated according to a at least one predetermined criterion 140. If this criterion 140 is met (truth value 1), the checked record 3a-3c and its associated label 4a-4c are included in the set 1a of training data on which the machine-learning model 1 is to be trained.

If the criterion 140 is not met (truth value 0), in the example shown in FIG. 1, an attempt is made to remedy the inconsistency. In step 160, a human expert 6 is prompted for a decision 7 whether to accept 170 the combination of the record 3a-3c and its label 4a-4c as plausible, or whether to reject 180 this combination. If the combination is accepted, this may come with amendment of the record 3a-3c and/or its label 4a-4c (block 171), or without such amendment (block 172). As discussed before, examples for amendments are corrections of wrong associations between record 3a-3c, label 4a-4c and equipment 51, or other mix-ups or obvious mistakes.

In particular, in block 161, the record 3a-3c, and/or the label 4a-4c, may be compared to other records 3a-3c, and/or to other labels 4a-4c, obtained on another instance of the same kind of equipment 51 within the same plant 50. In block 162, the result of this comparison is presented to the expert 6. For example, the message presented to the expert may ask: "Attention! The label you entered—Pump 3 is not working—conflicts with information already on file. Did you mean to say that Pump 2 is not working? This would be consistent."

The finally obtained set 1a of training data is used in step 190 to optimize the set 1b of parameters that characterize the behavior of the machine-learning model 1, thereby training this model 1. This may be done by the same entity that has refined the set 1a of training data as described above, or by a different entity.

Also, as discussed before, the method 100 may be started at a time where the physical acquisition of the measurement data 3 is already finished. But if the method 100 is started at a time where this physical data acquisition is still ongoing or even completely outstanding, then the information that is accruing in the course of the method 100 may be directly used to streamline this physical data acquisition.

In step 260, the already determined plausibilities 3a*-3c*, 4a*-4c* may be exploited to determine which sensors 2a-2c should be used to obtain further measurement data 3, and/or to which piece of equipment 51 further measurement data 3 should relate. For example, if there is too little plausible measurement data 3, or too few corresponding labels 4a-4c, for a particular piece of equipment 51, then a service robot 9 may be directed to this piece of equipment 51 to gather more data.

In step 270, based on the records 3a-3c of measurement data 3 in combination with pre-stored information about the layout 50a of the industrial plant 50, and/or about the inventory 51b of the equipment 51 that is installed in the plant 50, the position 9a of the service robot 9, and/or an identifier 51b of the equipment 51 currently under test, is determined.

Figure 2:
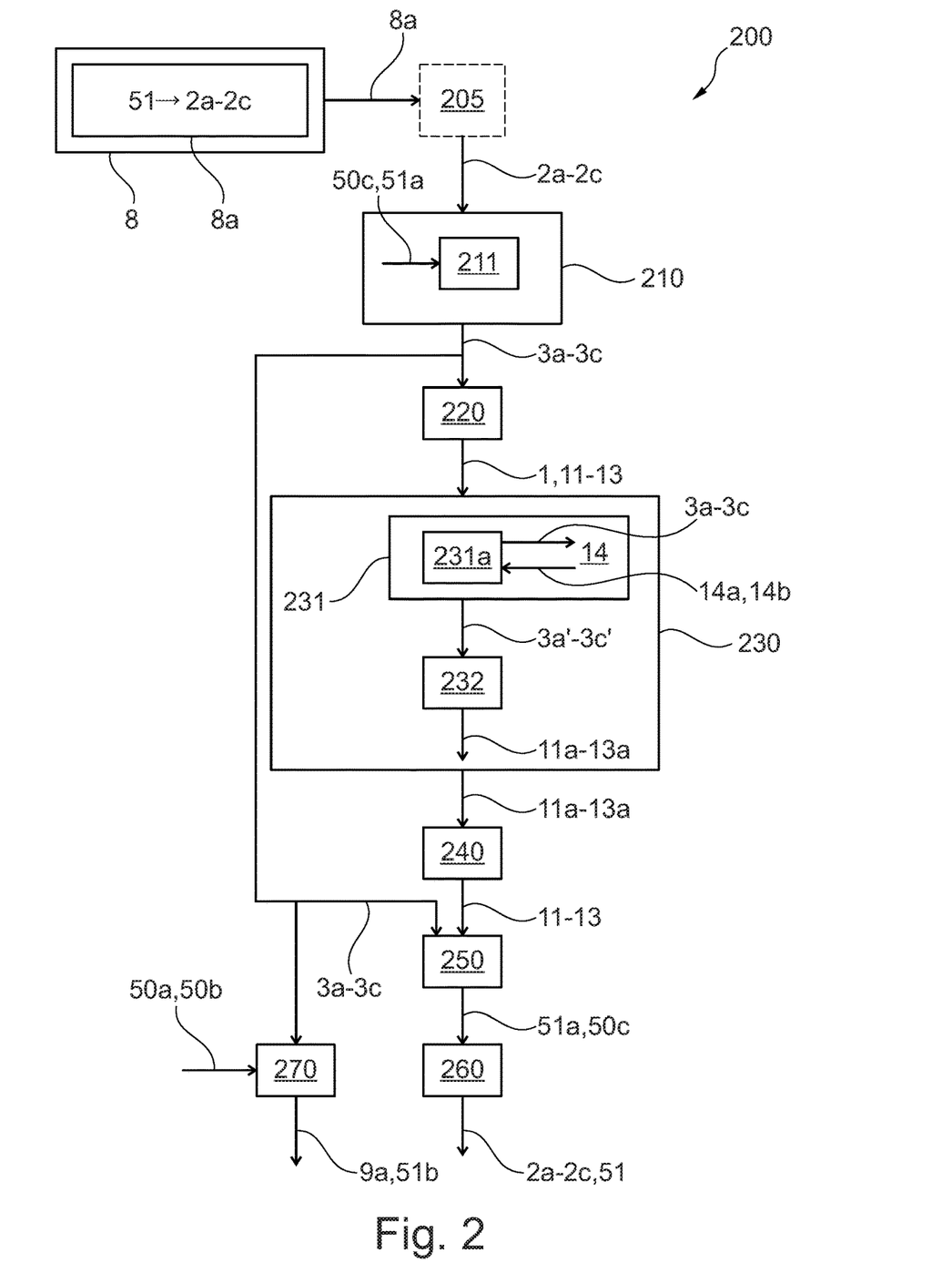

FIG. 2 is a flow chart of an exemplary embodiment of the method 200 for assessing the condition 51a of industrial equipment 51 in a plant 50, and/or the condition 50c of a process running in the plant 50. In optional step 205, a database 8 that stores associations 8a between pieces of equipment 51 and sensors 2a-2c deemed suitable for assessing the respective condition 51a of this equipment 51 is exploited to determine select sensors 2a-2c from which to acquire records 3a-3c of measurement data 3. In this manner, it is ensured that only information which is pertinent to the currently sought condition 51a is acquired.

In step 210, at least one record 3a-3c of measurement data 3 is obtained. This record 3a-3c describes an operating situation of the equipment 51, and/or of the process, whose condition 50c, 51a is to be assessed. The interval at which this obtaining 210 of records 3a-3c is repeated may be determined based on a previous history of the assessed condition 50c, 51a, according to block 211. That is, if the equipment 51 is on the "bad actor" list, or if the process is running on the brink of instability, it is checked more frequently.

In step 220, a plurality of trained machine-learning models 1, 11-13 are obtained. Each such model 11-13 is configured to map the record 3a-3c of measurement data 3 to an indication of the condition 50c, 51a.

In particular, there may be a larger collection of models 11-13 that may assess the condition 50c, 51a based on a wide variety of data. In step 220, out of this large collection, only those models 11-13 that accept the record 3a-3c currently at hand as input may be selected.

All models 11-13 selected at this stage are thus in principle capable of assessing the condition 50c, 51a from the record 3a-3c. In step 230, it is determined which of the models 11-13 is best for this purpose. To this end, a figure of fitness 11a-13a to assess the situation described by the record 3a-3c is assigned to each model 11-13. In step 240, at least one model 11-13 whose figure of fitness 11a-13a meets a predetermined criterion is selected.

In the example shown in FIG. 2, the quality of the measurement data 3, 3a-3c is examined in order to arrive at a figure of fitness 11a-13a. In block 231, a measure 3a'-3c' for the quality, and/or the disturbances, of the records 3a-3c is determined, and in block 232, the figure of fitness 11a-13a is assigned to the machine-learning model 11-13 based at least in part on the fitness of this model 11-13 to process records 3a-3c that is similar in quality, and/or in disturbances, to the measure 3a'-3c'.

For example, if the measure 3a'-3c' for the quality indicates that an acquired record 3a-3c contains an image with Gaussian white noise, the figure of fitness 11a-13a is higher for models 11-13 that still assess the condition 50c, 51a of the equipment 51, and/or of the process, with sufficient accuracy despite the presence of the Gaussian white noise.

Specifically, according to sub-block 231a, another trained machine-learning model 14 may be queried with the record 3a-3c to obtain a classification value 14a, and/or a regression value 14b, as a measure 3a'-3c' of the quality. As discussed before, such a model may, for example, classify records 3a-3c according to the disturbances contained therein.

In step 250, the record 3a-3c of measurement data is mapped to the sought condition 50c, 51a using the at least one selected trained machine-learning model 11-13.

As discussed before, first selecting a suitable machine-learning model 11-13 and then applying this one to determine the condition 50c, 51a provides a much higher flexibility. It is not necessary to produce a monolithic "one size fits all" model. Rather, if a new model 11-13 has been developed that is particularly suitable to process records 3a-3c that contain a new kind of disturbance, this new model 11-13 may simply be added to the catalogue of available models 11-13, and it will be selected where appropriate. In particular, nothing of the already expended training is lost. By contrast, if only one single monolithic model was used, any change to this model would necessitate at least a partial retraining.

Also, there is more flexibility regarding the kinds of data that may be used in order to determine the condition 50c, 51a. For example, it may be discovered that vibrations of a pump may also be discerned from variations in the magnetic field close to the pump. In this case, the new model may simply be added, and it may be determined in an adaptive manner whether the previous determination of vibration from noise or the new determination of vibration from magnetic fields is more accurate. By contrast, it would be quite difficult to construct a monolithic machine-learning model that accepts both noise and magnetic field data as input.

Akin to FIG. 1, in step 260, the determined condition 50c, 51a may be used to plan which sensors 2a-2c are to be used next, and/or on which equipment 51 or process the next measurements should be performed.

Akin to FIG. 1, based on the records 3a-3c of measurement data 3 in combination with pre-stored information about the layout 50a of the industrial plant 50, and/or about the inventory 51b of the equipment 51 that is installed in the plant 50, and/or about the process, the position 9a of the service robot 9, and/or an identifier 51b of the equipment 51 currently under test, is determined.

Figure 3:
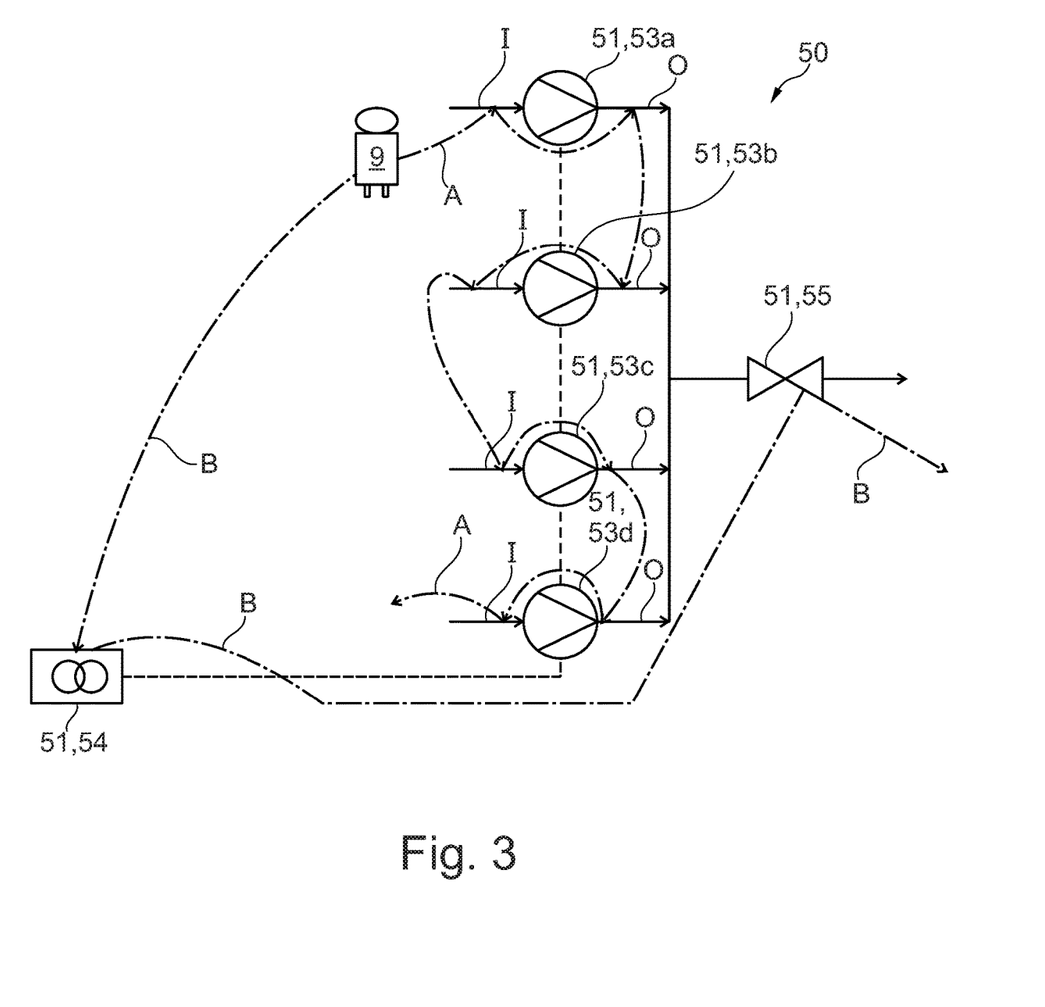
FIG. 3: Exemplary application of the method 200 in a pumping plant 50.

FIG. 3 shows an exemplary application of the method 200 in an industrial plant 50. The plant 50 is a pumping plant comprising four parallel pumps 53a-53d, one transformer 54 for supplying power to the pumps 53a-53d, and one throttling valve 55 downstream of the pumps 53a-53d. FIG. 3 shows two different inspection tours that the inspection robot 9 may execute in the plant 50. The pumps 53a-53d, the throttling valve 55 and the transformer 54 are all pieces of equipment 51 whose condition 51a is to be monitored.

The pumps 53a-53d have the highest propensity for wearing down or for failing due to another reason. They are therefore served on inspection tour A that is executed more frequently. This tour leads to the inlet area I and to the outlet area O of each pump 53a-53d. In this example, the records 3a-3c of measurement data 3 acquired at every stop of the inspection robot 9 are indicative of vibrations in the respective inlet area I or outlet area O.

The throttling valve 55 is much more robust and much more simple than the pumps 53a-53d. It therefore has a much lesser propensity of failing. This is even more true for the transformer 54 that has no moving parts at all. Therefore, the transformer 54 and the throttling valve 55 are visited by the inspection robot 9 on the longer inspection tour B that is executed less frequently.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 machine-learning model
1a set of training data for machine-learning model 1

1b set of parameters characterizing behavior of machine-learning model 1
2a-2c sensors
3 measurement data
3a-3c records of measurement data 3
3a*-3c* plausibilities of records 3a-3c
3a'-3c' measures for quality of records 3a-3c
4a-4c labels for records 3a-3c
5 additional information about process, equipment 51 or plant 50
6 human expert
7 decision, supplied by human expert 6
8 database
8a association between equipment 51 and suitable sensors 2a-2c
9 inspection robot
9a position of inspection robot 9 in plant 50
11-13 trained machine-learning models 1
11a-13a figures of fitness of models 11-13 to assess given situation
14 further machine-learning model to rate quality 3a'-3c'
14a classification value delivered by further model 14
14b regression value delivered by further model 14
50 industrial plant
50a layout of plant 50
50b inventory of equipment 51 in plant 50
50c condition of process running in plant 50
51 equipment in industrial plant 50
51a condition of equipment 51
51b identification of equipment 51
53a-53d pumps as equipment 51
54 transformer as equipment 51
55 throttling valve as equipment 51
100 method for training machine-learning model 1
110 obtaining records 3a-3c of measurement data 3
120 obtaining labels 4a-4c for records 3a-3c
130 determining plausibilities 3a*-3c*, 4a*-4c*
140 criterion for plausibilities 3a*-3c*, 4a*-4c*
150 including record 3a-3c and label 4a-4c into set 1a of training data
160 querying human expert 6 for decision 7
161 searching for similar equipment 51
162 querying expert based on similar equipment 51
170 accepting measurement data 3a-3c and label 4a-4c as plausible
171 accepting 170 with amendment
172 accepting 170 without amendment
180 rejecting records 3a-3c and label 4a-4c
190 training set 1b of parameters of model 1 using set 1a of training data
200 method for assessing condition 50c, 51a of process and/or equipment 51
205 selecting suitable sensors 2a-2c using database 8
210 obtaining record 3a-3c of measurement data 3
211 fixing interval for repeating the obtaining 210
220 obtaining plurality of trained models 11-13
230 determining figure of fitness 11a-13a for each model 11-13
231 determining measure 3a'-3c' for quality
231a querying further trained model 14
232 determining figure of fitness 11a-13a based on measure 3a'-3c'
240 selecting model 11-13 with suitable figure of fitness 11a-13a
250 applying selected model 11-13 to determine condition 50c, 51a
260 determining sensors 2a-2c, equipment 51 for new measurements
270 determining position 9a of robot 9, identification 51b of equipment 51
A, B inspection tours for inspection robot 9
I inlet area of pump 53a-53d
O outlet area of pump 53a-53d

What is claimed is:

1. A computer-implemented method for assessing at least one condition of industrial equipment, and/or at least one condition of a process running in an industrial plant, based on measurement data gathered by a plurality of sensors, the method comprising:
obtaining at least one record of measurement data that describes an operating situation of the equipment, and/or of the process;
obtaining a plurality of trained machine-learning models that are each configured to map the record of measurement data to an indication of the condition;
determining, for each of the trained machine-learning models, a figure of fitness to assess a situation described by the record of measurement data by determining a measure for a type and/or a strength of any disturbance contained in the measurement data and determining a fitness of the trained machine-learning model to process measurement data that contain disturbances of the type and/or strength;
selecting from the trained machine-learning models whose figure of fitness meets a predetermined criterion a simple model and a computationally intensive model, wherein the selection of the trained machine-learning models is further based on one or more of a requirement for accuracy and for a confidence of the assessment of the condition; and
mapping the record of measurement data to a sought condition using the selected trained machine-learning models by cascading the plurality of trained machine-learning models in that:
in an initial screening of the plant, a fast cursory assessment of the record of measurement data is performed by the simple model; and
in response to the simple model indicating that the condition may be abnormal, the computationally intensive model that works on complex measurement data is applied and used to further investigate the condition, and
in response to the abnormal condition meeting a predetermined criterion, taking one or more corrective actions including:
flagging the equipment for maintenance and/or repair, and/or for future more frequent inspection;
changing operating parameters of the equipment to ease a load on the equipment;
changing operating parameters of the process to move the process to a stable state;
and/or shutting down the equipment, and/or the process, to prevent further damage.

2. The method of claim 1, wherein the determining the measure for the quality of the measurement data comprises:
supplying the measurement data to a further trained machine-learning model that is configured to produce a classification value, and/or a regression value, as a measure for the quality.

3. The method of claim 1, further comprising:
before obtaining the record of measurement data using a plurality of sensors, selecting a subset of the plurality of sensors according to a database that stores associations between equipment whose condition is to be assessed and sensors that are suitable for assessing the condition of this equipment.

4. The method of claim 3, wherein selecting of the subset of the plurality of sensors is dependent on the sensors operating on a finite supply of a consumable.

5. The method of claim 1, wherein an interval at which the obtaining of records of measurement data is repeated is determined based on a previous history of the assessed condition.

6. The method of claim 1, further comprising: selecting at least one sensor from which to obtain further measurement data, and/or a piece of equipment to which further measurement data are to relate, based at least in part on an already determined plausibility, and/or on an already assessed condition.

7. The method of claim 1, wherein the plurality of sensors comprises sensors mounted on a service robot that is configured to move between different pieces of equipment, and/or between different processes, in the industrial plant.

8. The method of claim 7, further comprising:
determining a location of the service robot in the industrial plant, and/or an identification of the equipment that is being sensed by the sensors of the service robot, based on a match between measurement data captured by the sensors and pre-stored information about a layout of the industrial plant, and/or about an inventory of the equipment installed in the plant.

* * * * *